Aug. 14, 1928. 1,680,574
H. T. SHIPLEY
SELF DUMPING ATTACHMENT FOR ROAD SCRAPERS
Filed Feb. 21, 1927
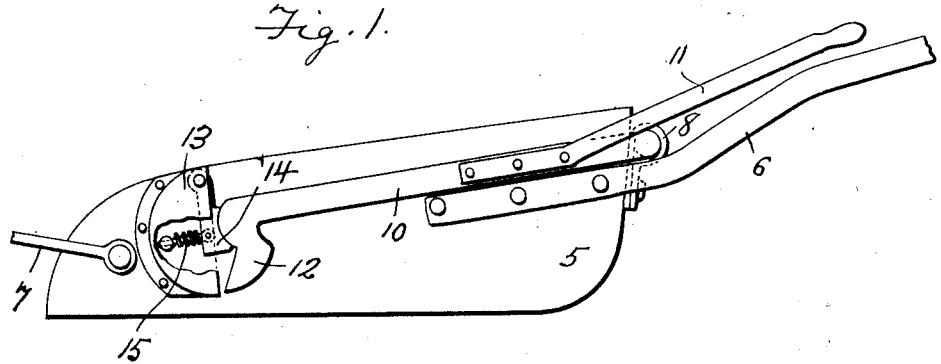
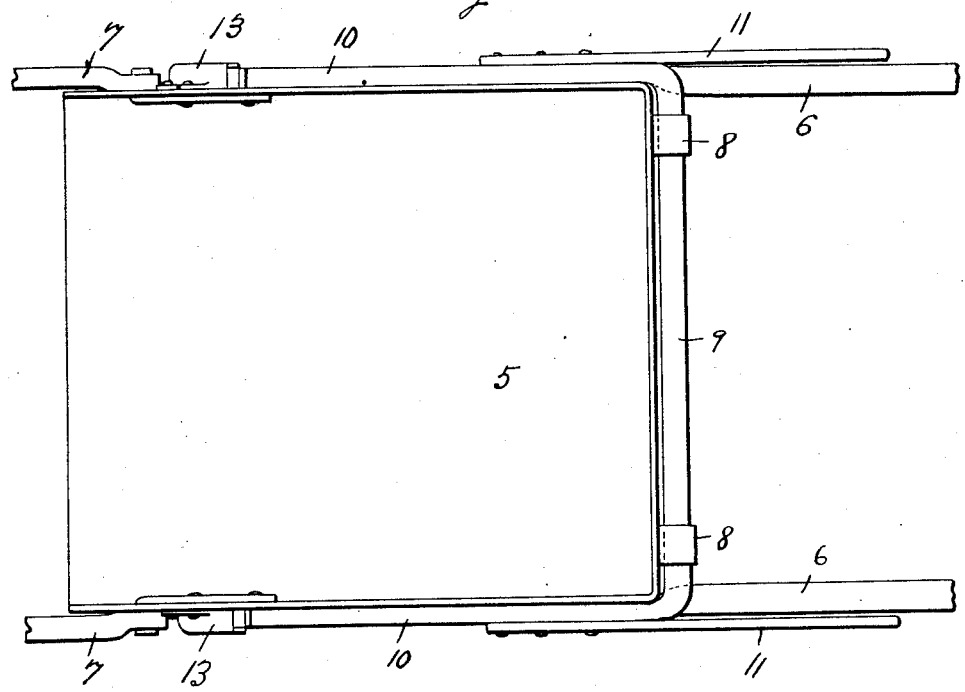
Inventor
Henry T. Shipley
By Clarence A. O'Brien
Attorney Patented Aug. 14, 1928.

1,680,574

UNITED STATES PATENT OFFICE.

HENRY T. SHIPLEY, OF LAKEWOOD, WISCONSIN.

SELF-DUMPING ATTACHMENT FOR ROAD SCRAPERS.

Application filed February 21, 1927. Serial No. 169,903.

The present invention relates to an attachment for scrapers, scoops, and the like and has for its principal object to provide a device which may be conveniently released by the workmen to engage the ground so as to dump the scrapers, scoop or the like upon the continued pull of the draft animal or other draft means being used.

Another very important object of the invention lies in the provision of an attachment of this nature which is exceedingly simple in construction, inexpensive to manufacture, thoroughly reliable and efficient in use, easy to manipulate, strong and durable, not likely to easily become out of order, and otherwise well adapted to the purpose for which it is designed.

With the above and numerous other objects in view, as will appear as the description proceeds, the invention resides in certain novel features of construction and in the combination and arrangement of parts as will be hereinafter more fully described and claimed.

In the drawing:

Figure 1 is a side elevation of a scraper showing my attachment thereon,

Fig. 2 is a top plan view thereof.

Referring to the drawing in detail it will be seen that the numeral 5 denotes a scraper of any preferred or conventional formation having the usually rearwardly and upwardly projecting handles 6 and the draft attachment means 7 at the forward end thereof. This scraper is illustrated merely by way of example to bring out the utility of the attachment and does not form a part of the present invention.

Referring now particularly to the attachment it will be seen that numerals 8 denote two bearing brackets which are mounted on the rear wall of the scraper 5. A U-shaped member has its bight portion 9 journaled in the bearing bracket 8 and its arms 10 extending along the sides thereof. Handles 11 are rigidly engaged with the arms 10 and extend upwardly and rearwardly in close proximity to the handles 6 to be in convenient reach for the operator. The free ends of the arms 10 are provided with downwardly disposed lateral ground-engaging extensions 12. Casings 13 are mounted on the sides of the scraper 5 adjacent the forward ends thereof and have pivotally mounted therein catches 14 which are spring pressed outwardly as at 15 for engaging the free ends of the arms 10 to hold them in the position shown in Fig. 1, that is, so that the ground-engaging elements 12 are freed from the ground.

When the scraper 5 is full and it is desired to dump the same, the operator lifts upwardly on one or both of the handles 11 thus swinging downwardly the free ends of the arms 10 disengaging them from the spring pressed catches 14 so that the ground engaging elements 12 will engage the ground, thus causing the rear end of the scraper to be lifted as it is pulled further forwardly, causing the front end thereof to engage in the ground thus finally toppling over the scraper so as to dump the same. When so dumped the operator may easily grasp one or both of the handles 11 and right the scoop as will be quite apparent and the free ends of the arms 10 will engage with the spring pressed catches 14.

It is thought that the construction, operation, and utility and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A self dumping attachment for road scrapers comprising an arm, means for pivoting the arm to the rear portion of the scraper, spring pressed means for supporting the forward free end of the arm, road engaging means on the free end of said arm.

2. A self dumping attachment for road scrapers comprising an arm, means for pivoting the arm to the rear portion of the scraper, spring pressed means for supporting the forward free end of the arm, road engaging means on the free end of said arm, means for releasing the arm so that its road-engaging means may be placed in operation for dumping the scraper.

3. In combination, a road scraper, a pair of arms, one on each side of the scraper, means for pivoting the rear ends of the arms to the rear portion of the scraper, spring pressed means for supporting the forward ends of the arms, lateral depending extensions on the forward ends of the arms for engaging the ground when the forward ends of the arms are free from the spring pressed means.

4. In combination, a road scraper, a pair of arms, one on each side of the scraper, means for pivoting the rear ends of the arms to the rear portion of the scraper, spring pressed means for supporting the forward ends of the arms, lateral depending extensions on the forward ends of the arms for engaging the ground when the forward ends of the arms are free from the spring pressed means, handles extending rearwardly from the rear portions of the arms.

5. In combination, a scoop, a bearing bracket on the rear of the scoop, a U-shaped member having its bight journaled in the bracket and its arms extending along the sides of the scoop, the ends of the arms terminating in laterally and downwardly disposed ground engaging extensions, casings on the sides of the scoop adjacent the forward end thereof, spring pressed catches pivotally mounted in the casings to engage the free ends of the arms.

6. In combination, a scoop, a bearing bracket on the rear of the scoop, a U-shaped member having its bight journaled in the bracket and its arms extending along the sides of the scoop, the ends of the arms terminating in laterally and downwardly disposed ground engaging extensions, casings on the sides of the scoop adjacent the forward end thereof, spring pressed catches pivotally mounted in the casings to engage the free ends of the arms, handles extending rearwardly and upwardly from the rear portions of the arms, and handles extending rearwardly and upwardly from the scraper, said handles of the scraper and the handles of the attachment being in close proximity to one another.

In testimony whereof I affix my signature.

HENRY T. SHIPLEY.